June 12, 1956

A. GODAT 2,749,779

REVERSIBLE INPUT UNIDIRECTIONAL
OUTPUT TRANSMISSION GEARING
Filed Feb. 18, 1952

Inventor
Abel Godat by Karl Michaely Atty.

United States Patent Office 2,749,779
Patented June 12, 1956

1

2,749,779

REVERSIBLE INPUT UNIDIRECTIONAL OUTPUT TRANSMISSION GEARING

Abel Godat, Bienne, Switzerland, assignor to Bulova Watch Company Inc., New York, Bienne Branch, Bienne, Switzerland, a joint-stock company of Switzerland Application February 18, 1952, Serial No. 272,138

Claims priority, application Switzerland December 15, 1951

3 Claims. (Cl. 74—812)

This invention relates to reversible torque power transmission gearing for converting the reversible input in a clockwork or similar mechanism to unidirectional output. It will be described hereinafter as applied to the type of self-winding watches comprising an oscillating weight, the rocking movements of which are instrumental in winding the watch.

In watches of the type here in view the oscillating weight acts on two one-way couplings, in which a pinion of one coupling is in mesh with a pinion of the other coupling and with another pinion mounted on the axle of, and fixed to, the oscillating weight, while the other pinions of the two couplings are in mesh with the winding wheel, which turns the barrel arbor.

According to this invention, now, those wheels of the two couplings, which are in mesh with each other, are the fixed wheels of the couplings, while the two sliding pinions of the couplings are axially acted upon by a spring in such manner that the one-way toothings of the sliding pinions come into engagement with the teeth of the two fixed pinions.

The two couplings preferably are of equal design with their axes extending in the same plane as the axis of the oscillating weight.

Preferably a double-armed spring generally of the horse-shoe type, fixed to the watch movement is provided for axially acting on the sliding pinions of the two couplings.

In the drawings affixed to this specification and forming part thereof an embodiment of this invention is illustrated diagrammatically by way of example, all parts not required for the understanding of the invention being omitted.

In the drawings:

Fig. 1 is a plan view, while

Figure 1:
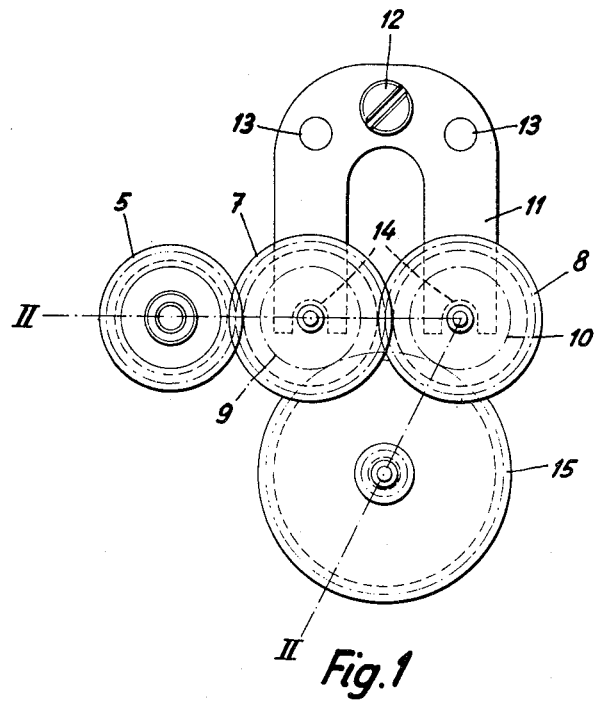

Referring to the drawings, 1 is the oscillating weight which is keyed onto a sleeve 2 pivoted in a well-known manner in the center of the watch movement around a flanged axle stub 3 fixed in a lower bridge 4 arranged above the train wheel bridges (not shown).

Figure 2:
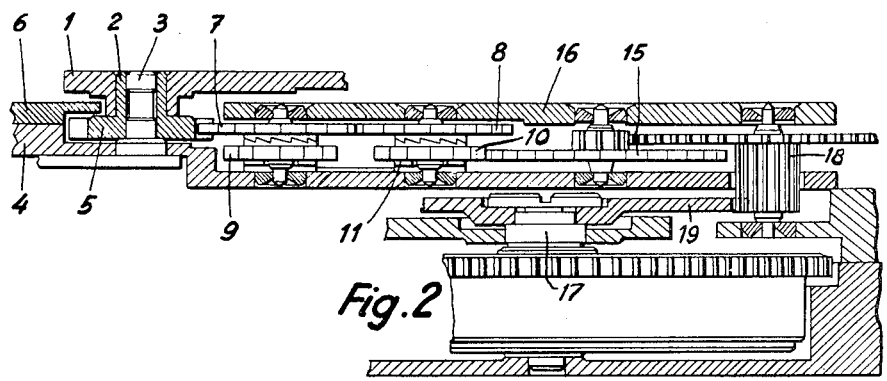
Fig. 2 is a cross-section along the line II—II of Fig. 1.

The sleeve 2 is integral with the pinion 5 which is integral, and mounted coaxially, with the oscillating weight. This weight is held in position in the axial direction by means of a bracket 6 shown in part in Fig. 2, which can be removed.

The pinion 5 is in mesh with the upper pinion 7, fixed on its axle, of the first one-way coupling. The pinion 7 is in mesh with the fixed upper pinion 8 of the second one-way coupling, whose axle extends in the same plane

2 as the axles of the first coupling and of the oscillating weight.

The sliding pinions 9 and 10 of the two one-way couplings of uniform design are acted upon from below by the double-armed spring 11 of horse-shoe form in such manner that the Breguet toothing of each sliding pinion is engaged in the toothing of the fixed pinion of the corresponding coupling. The spring 11 is fixed in place by a screw 12 and two pins 13. The indentations 14 at the ends of the two arms of the spring provide a secure engagement of the spring with the sliding pinions and prevent their being acted upon in a direction not in parallel with their axes. Owing to this arrangement a very sensitive spring may be used which is just able to lift the sliding pinions and keep them engaged with their fixed pinions. By this arrangement the wear of the coupling teeth when they are decogged and the amount of energy required for decogging them are kept low.

The pinions 9 and 10 are both of them in mesh with a winding wheel 15 which is pivoted in the same lower and upper bridges 4 and 16 as the two Breguet couplings. The winding wheel carries along the barrel arbor 17 by means of a step-down gear 18 and a ratchet-wheel 19.

For instance, when the oscillating weight 1 effects a clockwise rotation, the pinion 7 rotates in counter-clockwise direction and carries along the sliding pinion 9 in the same direction and the winding wheel 15 in clockwise direction. The pinion 8 is then carried along by the pinion 7 in clockwise direction, the pinion 10 by the winding wheel 15 in counter-clockwise direction. In this way the one-way toothings of the two pinions of the second coupling are simply decogged.

When the oscillating weight displaces itself in the opposite sense, obviously the second one-way coupling turns the winding wheel 15 by means of its pinion 10 in clockwise direction. The Breguet toothings of the two pinions of the first coupling are then simply decogged.

It can be guessed from the foregoing that the energy stored in the winding spring is not capable of turning the winding wheel 15 in a direction counter to the winding direction, because in that case the two couplings are in engagement and their upper pinions are acted upon in the opposite direction.

The principal advantage offered by the arrangement hereabove described of the winding mechanism resides in the fact that the upper pinions which act on the winding wheel 15, are fixed on their axles and therefore are always engaged in the same place, while the lower pinion which is decogged, can never lead.

I wish it to be understood that I do not desire to be limited to the details shown in the drawings and described in the foregoing specification for obvious modifications will occur to persons skilled in the art.

I claim:

1. Reversible power transmission gearing for self-winding watches comprising in combination, a driving pinion, two one-way couplings, one pinion of a one-way coupling meshing with said driving pinion and with a pinion of the other Breguet coupling, a winding wheel and a barrel arbor controlled by said winding wheel, the other pinion of each coupling meshing with said winding wheel, the two coupling pinions in engagement with each other being fixed on their axles, while the other pinions of said couplings are sliding pinions and a spring is arranged to keep the one-way couplings in engagement.

2. The combination of claim 1 comprising a clockwork frame in which the spring which keeps the one-way couplings of the sliding pinions in engagement, is a substantially horse-shoe shaped double-armed spring fixed to said clockwork frame and capable of acting in axial direction on the sliding pinions of the couplings.

3. The combination of claim 1, in which the two one-way couplings are of uniform design and their axes extend in the same plane as the axis of the driving pinion.

References Cited in the file of this patent

UNITED STATES PATENTS

| | | |
|---|---|---|
| 954,672 | Didierjean | Apr. 12, 1910 |
| 1,710,631 | Loram | Apr. 23, 1929 |
| 2,350,580 | Blackley et al. | June 6, 1944 |
| 2,496,572 | Williams | Feb. 7, 1950 |

FOREIGN PATENTS

| | | |
|---|---|---|
| 170,938 | Switzerland | Nov. 1, 1934 |